March 27, 1951  L. P. FRIEDER ET AL  2,546,689
MULTIPLE LINE RELEASE MECHANISM

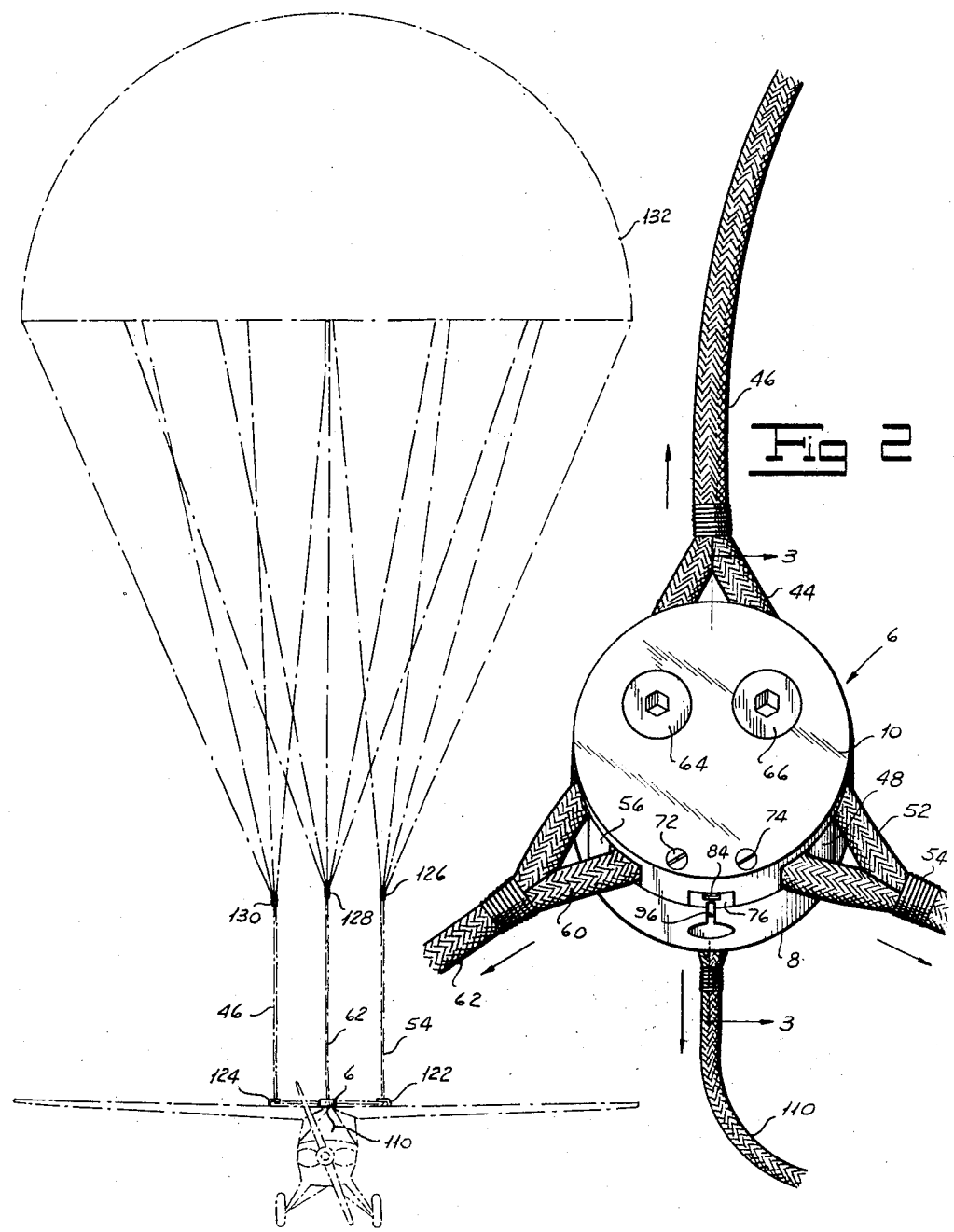

Filed March 31, 1948  2 Sheets-Sheet 2

INVENTOR
LEONARD P. FRIEDER
WALTER S. FINKEN
BY Henry L. Shenier
ATTORNEY

Patented Mar. 27, 1951

2,546,689

UNITED STATES PATENT OFFICE 2,546,689

MULTIPLE-LINE RELEASE MECHANISM

Leonard P. Frieder, Great Neck, and Walter S. Finken, Brooklyn, N. Y., assignors, by mesne assignments, to Reconstruction Finance Corporation, Philadelphia, Pa., a corporation of the United States Application March 31, 1948, Serial No. 18,108

14 Claims. (Cl. 24—73)

1

Our invention relates to a multiple line release mechanism and more particularly to a device for releasing a plurality of suspension lines of a parachute canopy from the load at any desired time as for example when the load has reached the ground.

In air-borne operations, many heavy loads are dropped from the mother ship by means of parachutes and it is highly desirable to provide a means for connecting a load to the parachute shrouds in such a manner that the parachute canopy can be readily released as soon as the load reaches the ground. The attaching means must be secured so as to carry a load with safety and yet must be readily releasable in such a manner as to prevent any danger of dragging the load after it is grounded as may occur at times when the velocity of the wind at the ground level is high. The problem of dropping objects from mother ships is complicated when it is attempted to drop small airplanes. In order to prevent injury to the small airplane, it must land upon its landing gear and it becomes quite necessary that the parachute canopy be released as soon as the small airplane has been grounded to prevent injury to the wings, propeller and fuselage of the plane. In order to attain the necessary stability which will insure that the small airplane will land in the proper position, it must be supported from a plurality of points so arranged about its center of gravity that it will land in substantially the proper position. This requires the use of multiple lines.

One object of our invention is to provide a multiple line release mechanism for attaching loads to parachute canopies by means of a plurality of lines in such a manner that the lines may be quickly and surely released when the load is ground-borne.

Another object of our invention is to provide a multiple line release mechanism adapted to be used for the release of a parachute from a small airplane following a drop by parachute from a mother plane.

Another object of our invention is to provide a ready release for a multiple line attachment to a parachute which may be released by an operator at will.

Another object of our invention is to provide a multiple line release mechanism which is simple in construction and sure in operation by which a heavy load may be safely attached to a parachute canopy for easy, sure and rapid release.

Other and further objects of our invention will appear from the following description.

2

In the accompanying drawings which form part of the instant specification and which are to be read in conjunction therewith and in which like reference numerals are used to indicate like parts in the various views:

Figure 1 is a view showing a parachute canopy attached to a small airplane by means of our multiple line release mechanism.

Figure 2 is a perspective view drawn on an enlarged scale showing our multiple line release mechanism.

For purposes of illustration and not by way of limitation, we have shown a multiple line release mechanism for securing three lines in a readily detachable manner. It is to be understood, however, that our mechanism may be employed with any appropriate number of lines without departing from the principle employed.

In general, our invention contemplates the provision of a housing in which we pivot a plurality of bell cranks corresponding to the number of multiple lines to be releasably secured. The bell cranks pivot in vertical planes disposed radially about the housing and forming equal angles with each other. One arm of each bell crank extends substantially at right angles to the other arm thereof so that when one arm is in a vertical position then the other arm is in a horizontal position. Each of the arms adapted to be disposed horizontally is provided with a toe vertically displaced from the toe of an adjacent crank through the thickness of the toe of the adjacent crank. The cranks' toes are adapted to be positioned one on top of the other so that the toe of an adjacent crank rests on top of the toe of its neighbor crank and holds it in horizontal position. A trigger block is adapted to hold the uppermost toe in horizontal position so that all of the toes and the trigger block are in compression under the influence of the load.

The trigger block is controlled by a lever adapted to reciprocate it. The lever is provided with a web having a cam slot in which a pin is disposed, attached to a reciprocating member extending at right angles to the trigger block. A lanyard is secured to the reciprocating member so that when it is pulled the trigger block may be moved to a position clear of the uppermost toe, permitting its bell crank to rotate under the influence of the load, thus permitting the adjacent bell cranks to rotate simultaneously so that the lines are released substantially simultaneously.

Figure 4:
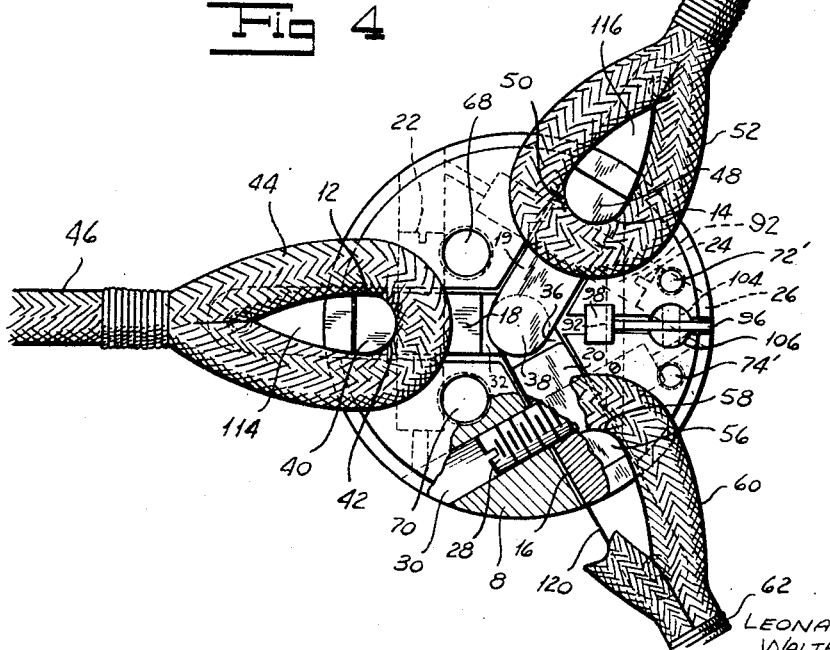
Figure 4 is a plan view of the multiple release with the upper portion of the housing and the trigger block removed and parts broken away.

Referring now to the drawings, a housing, indicated generally by the reference numeral 6, comprises a body member 8 and a cover member 10. The body member is provided with three rabbets 12, 14 and 16, in which we pivot three bell cranks 18, 19 and 20. The bell crank 18 is pivoted about a pin 22, lodged in the body member and extending at right angles to the rabbet 12. The crank 19 is pivoted about a pin 24, carried by the body member in an opening 26, extending at right angles to the rabbet 14. The bell crank 20 is pivoted about a pin 28, lodged in an opening 30, formed in the body member 8. The bell crank 18 is provided with a toe 32 adapted to lay on the floor 34 of the body member 8. The bell crank 20 is provided with a toe 36 adapted to rest on top of the toe 32 and the bell crank 19 is provided with a toe 38 adapted to nest on top of the toe 36. The bell crank 18 has an upper arm 40, provided with a rounded surface 42 against which an eye 44, formed upon a line 46, is adapted to bear. The bell crank 19 is provided with an upper arm 48, provided with a rounded surface 50 against which the eye 52, formed on a line 54, is adapted to bear. The bell crank 20 is provided with an upper arm 56, provided with a rounded surface 58 against which the eye 60 of a line 62 is adapted to bear. The cover member 10 is secured to the body member 8 by means of a pair of screws 64 and 66 disposed on each side of the bell crank 18. The screws are threaded into internally threaded bores 68 and 70, formed in the body member 8, as can readily be seen by reference to Figure 4. A pair of small screws 72 and 74 also secure the housing 10 to the body member 8. These screws are threaded in internally threaded bores 72' and 74' formed in the body member.

Figure 3:
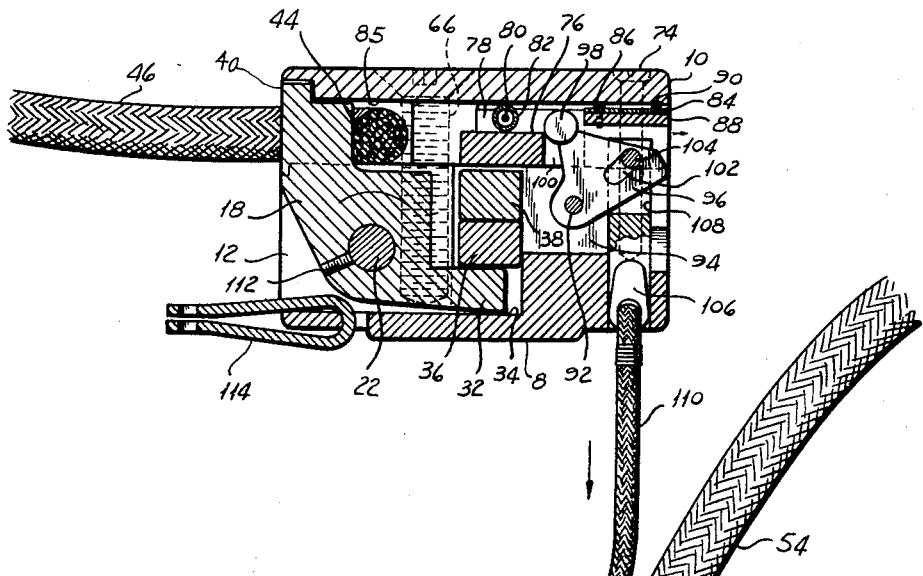
Figure 3 is a sectional view taken on the line 3—3 of Figure 2.

A trigger block 76, shown in Figure 3, is adapted to hold the upper toe 38 downwardly thus immobilizing all of the bell cranks. The trigger block is provided with a rabbet 78, across which a pin 80 extends. A roller 82 is disposed about the pin 80 and is adapted to roll along the undersurface 85 of the housing 10, thus reducing the friction when the trigger block is to be moved in the direction of the arrow shown in Figure 3. A spring 84 is secured to the upper portion of the trigger block by rivets 86. The spring is formed with a projection 88 adapted to seat in a reentrant portion 90, formed in the underside of the housing. The spring normally holds the trigger block in the position shown in Figure 3. A pin 92 extends across a rabbet 94, formed in the body member 8. A plate 96 is pivoted about the pin 92 and carries a member 98 which is seated in a recess 100, formed in the trigger block 76. The plate 96 is provided with a cam slot 102 in which a pin 104 is lodged. The pin is secured to a reciprocating member 106 adapted to move in a vertically disposed bore 108. The reciprocating member 106 is secured to a lanyard 110. The arrangement is such that the downward movement of the lanyard 110 pulls the member 106, which may be a rod, downwardly carrying the pin 104 downwardly, thus camming the plate 96 to rotate in a clockwise direction. This moves the member 98 to the right and carries the trigger block 76 to the right as viewed in Figure 3, thus releasing the uppermost toe 38 of the bell crank 19 and permitting it to pivot so that its upper arm will permit the eye 52 and attached line 54 to be freed. As soon as toe 38 begins to move upwardly, toe 36 of bell crank 16 and toe 32 of bell crank 18 will also move upwardly simultaneous with the movement of bell crank 19. The arrangement is such that all three lines are substantially simultaneously released. The cover member 10 is provided with reentrant portions adjacent the upper arms of the bell cranks to provide space within which the eyes 44, 52 and 60 are lodged. Each of the bell cranks is secured to its corresponding pin by a set screw 112 which will prevent the pin from drifting out of the body member 8. Secured to the body member, we provide a plurality of straps 114, 116 and 120. If the load is a small airplane, such as shown in dotted lines in Figure 1, the straps 114, 116 and 120 may be secured to the upper wing of the airplane at a point of structural strength. Symmetrically disposed about our multiple line release mechanism, we provide a plurality of fair leads, one for each line. These fair leads may take any suitable form, such as eyes 122 and 124 shown in Figure 1. The lines extend horizontally from our multiple release mechanism through the fair leads upwardly as shown in Figure 1 to be joined to groups of shrouds 126, 128 and 130 of a parachute canopy 132.

We will describe our invention for the dropping of a small airplane from a mother ship, though it is to be understood that our multiple line release may be applied for any appropriate purpose. The airplane to be dropped is secured to a parachute suitably folded in a pack of any appropriate design. The shroud lines of the parachute are divided into three groups and the ends of the groups are secured to three lines 46, 54 and 62, which extend through fair leads secured to the airplane to be dropped at strong points so that the lines are extended substantially horizontally to our multiple line release mechanism. The ends of the lines 46, 54 and 62 are provided with eyes of any appropriate design and the eyes disposed about the upper arms 40, 48 and 56 of the bell cranks 18, 19 and 20. The bell cranks are assembled with their upper arms in a substantially vertical position and the toes 32, 36 and 38 nested as shown in Figure 3 with the trigger block 76 over the upper surface of upper toe 38. The projection 88 of the spring 84 is seated in its reentrant portion 90 so that the trigger block is secured against being jarred outwardly both by the spring projection and by the friction between the trigger block and its adjacent surfaces.

When the drop is made, the parachute canopy opens and the load airplane falls to the earth with the position of the parts as shown in Figures 1 and 3. The fair leads 122 and 124 are spaced sufficiently far from the multiple release mechanism so as to give a good righting moment and the airplane will be carried substantially horizontally since the fair leads are disposed symmetrically about the center of gravity of the load which is in this case the small airplane being dropped. A passenger is assumed to be in the plane being dropped. As soon as the plane is grounded, the pilot pulls the lanyard 110, thus moving the rod 106 downwardly and carrying the pin 104 downwardly. The pin 104 moving in the cam slot 102 rotates the plate 96 in a clockwise direction and moves the trigger block 76 to the right as viewed in Figure 3. The upward thrust of the load communicated through the toes 32, 36 and 38 of the bell cranks against the trigger block creates friction. In order to insure that the trigger block will move to the right under this load, we provide the roller 62 positioned about the pin 80 so that the roller will reduce the friction between the trigger block 76 and the surface 85 of the cover member 10. It is to be noted that the load is directly borne by the fair leads 122, 124 and the like and that the static friction caused by the change of direction of the load lines 46, 54 and 62 is such that the actual pull on the eyes 44, 52 and 60 is considerably lessened. It is to be noted, too, that the load on the trigger block is in compression and not in tension when loads are applied to the upper arms of the bell cranks. It is further to be noted that the pull on the multiple line release mechanism is balanced in a horizontal plane and that substantially no upward thrust is taken by the multiple release mechanism so that its securing straps 114, 116 and 120 are used merely for convenience in locating the multiple release mechanism on the plane wing.

As soon as the trigger block moves clear of the upper toe 38, it and trigger blocks 36 and 32 are permitted to move upwardly, permitting the upper arms of the associated bell cranks 48, 56 and 40 to move outwardly. This outward movement is simultaneous for all of the bell cranks. As soon as the arm of the bell crank is free of the housing a sufficient amount to permit the eye carried by the upper arm to clear, the line carried by the eye is freed. The tilting of the surface of the upper arm carrying the eye assists in permitting the eye to slide freely from the arm. The lines are therefore released substantially simultaneously, which is the object of our invention.

Any appropriate means may be employed for providing the tug upon lanyard 110 for initiating a release action. A ground contact member, known to the art, may be provided so that its displacement will pull the lanyard 110 to release the lines upon grounding.

It will be seen that we have accomplished the objects of our invention. We have provided a multiple line release mechanism for attaching loads to parachute canopies by means of a plurality of lines in such a manner that the lines may be quickly and surely released when the load is ground-borne. Our multiple line release mechanism is adapted to be used for the release of a parachute from a small airplane following its drop by parachute from a mother plane. We have provided a multiple release mechanism which may be released by the operator at will. For example, if it were decided to start the motor of the plane while being carried by the parachute, the parachute could be detached by the pilot, the plane nosed into a dive until clear of the canopy and then the motor brought to flying speed. We have provided a multiple line release mechanism which is simple in construction and sure in operation and by which a heavy load may be safely attached to a parachute canopy for easy, sure and rapid release.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A release mechanism for securing a line having an eye at one end thereof, including in combination a housing formed with the re-entrant portion adapted to receive the eye, a bell crank pivoted in said housing having arms extending at an angle to each other, one of said arms adapted to be held in a substantially vertical position across said re-entrant portion and extending through said eye, a reciprocable compression block positioned in said housing between a portion of the housing and the other of said bell crank arms adapted to co-act with the other of said bell crank arms to immobilize the bell crank, and means for reciprocating said compression block.

2. A multiple line release mechanism adapted to secure a pair of lines in a readily detachable manner, each of said lines having an end thereof provided with an eye, including in combination a housing formed with a pair of re-entrant portions adapted to receive the eyes of the end of the lines, a pair of bell cranks pivoted in said housing each having one arm thereof positioned to extend across respective re-entrant portions and through respective eyes, the other arms of the bell cranks being formed with spaced portions adapted to nest one upon the other, slidable means positioned within said housing adapted to contact the upper spaced portion of one of said bell cranks whereby to immobilize it and the other bell crank, and means for moving said slidable means whereby to permit both bell cranks to pivot to release the eyes lodged about the upper arms of the bell cranks.

3. A multiple line release mechanism as in claim 2 in which said means for moving said slidable means comprises a pivoted member, means for pivoting said member in said housing with a portion thereof extending into contact with said slidable means and cam means for rotating said pivoted member to move said slidable means clear of the space portion carried by one of said bell cranks.

4. A multiple line release mechanism as in claim 2 in which said slidable means is provided with a spring member adapted to engages frictionally the housing initially to resist movement of said slidable means.

5. A multiple release mechanism as in claim 2 in which said slidable means is provided with friction-reducing means adapted to engage the housing.

6. A multiple line release mechanism including in combination a housing formed with a plurality of symmetrically-spaced re-entrant portions adapted to receive eyes carried by lines adapted to be secured in a readily releasable manner, a corresponding number of bell cranks pivoted in said housing having upper arms adapted to extend across the re-entrant portions and through respective eyes, the other arms of said bell cranks being formed with spaced portions adapted to nest one upon the other when the upper arms of the bell cranks are in line-securing position, a locking slide mounted in said housing for reciprocation therein, said locking slide adapted to overlie the upper of said nested spaced bell crank portions whereby to immobilize all of the bell cranks and means for mounting said locking slide to permit said bell cranks to pivot to release the lines.

7. A multiple line release mechanism as in claim 6 in which said bell cranks are mounted to pivot in vertical planes forming an angle of 120 degrees with each other.

8. A multiple line release mechanism as in claim 6 in which said locking slide is provided with an anti-friction roller carried thereby adapted to contact the housing to produce the friction of movement of the locking slide to bell crank releasing position.

9. A multiple line release mechanism as in claim 6 in which said locking slide is provided with a spring adapted frictionally to engage the housing whereby to inhibit the initial movement of the locking slide.

10. A multiple line release mechanism as in claim 6 in which said means for moving said locking slide includes a pivoted member, means for pivotally mounting said member within said housing, co-acting means formed upon said pivoting member and said locking slide, and means for camming said pivoted member to pivot whereby to move said locking slide.

11. A multiple line release mechanism as in claim 6 in which said means for moving said locking slide includes a pivoted member, means for pivotally mounting said member within said housing, co-acting means formed upon said pivoted member and said locking slide, a cam slot formed in said pivoted member, a pin extending through said cam slot, reciprocating means for carrying said pin and a lanyard secured to said reciprocating means for holding the same.

12. A multiple line release mechanism as in claim 6 in which said housing is formed by a body member and a cover member, means for securing the said cover member to said body member, said re-entrant portion being formed in said cover member.

13. A release mechanism for securing a line having an eye at one end thereof, including in combination a housing formed with the re-entrant portion adapted to receive the eye, a bell crank pivoted in said housing having arms extending at an angle to each other, one of said arms adapted to be held in a substantially vertical position across said re-entrant portion and extending through said eye, slidable means positioned in said housing adapted to co-act with the other of said bell crank arms to immobilize the bell crank, and means for moving said slidable member, said slidable member comprising a pivoted member, means for pivotally mounting said member in said housing, and cam means for rotating said pivoted member to move said slidable means clear of one of said bell crank arms whereby to free said bell crank.

14. A release mechanism for securing a line having an eye at one end thereof, including in combination a housing formed with the re-entrant portion adapted to receive the eye, a bell crank pivoted in said housing having arms extending at an angle to each other, one of said arms adapted to be held in a substantially vertical position across said re-entrant portion and extending through said eye, slidable means positioned in said housing adapted to co-act with the other of said bell crank arms to immobilize the bell crank, and means for moving said slidable member, and spring means initially resisting the movement of said slidable means.

LEONARD P. FRIEDER.
WALTER S. FINKEN.

REFERENCES CITED

The following references are of record in the file of this patent:

UNITED STATES PATENTS

| Number | Name | Date |
| --- | --- | --- |
| 2,108,491 | Kuhlemann | Feb. 15, 1938 |
| 2,430,341 | Johnson | Nov. 4, 1947 |

FOREIGN PATENTS

| Number | Country | Date |
| --- | --- | --- |
| 140,093 | Great Britain | 1920 |